US010607258B2

(12) United States Patent
Dey et al.

(10) Patent No.: US 10,607,258 B2
(45) Date of Patent: Mar. 31, 2020

(54) SYSTEM, METHOD, AND RECORDING MEDIUM FOR FIXED-WING AIRCRAFT ADVERTISEMENT USING LOCALLY SAMPLED WORD LISTENING (71) Applicant: International Business Machines Corporation, Armonk, NY (US)

(72) Inventors: Kuntal Dey, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 626 days.

(21) Appl. No.: 15/225,986

(22) Filed: Aug. 2, 2016

(65) Prior Publication Data
US 2018/0040028 A1 Feb. 8, 2018

(51) Int. Cl.
G06Q 30/02 (2012.01)
G10L 15/26 (2006.01)
G06K 9/00 (2006.01)

(52) U.S. Cl.
CPC ..... *G06Q 30/0269* (2013.01); *G06Q 30/0255* (2013.01); *G10L 15/26* (2013.01); *G06K 9/00281* (2013.01)

(58) Field of Classification Search
CPC ..................................................... G06Q 30/02
USPC ............... 455/556.1; 704/231, 246; 725/141; 382/100; 707/723
See application file for complete search history.

(56) References Cited

U.S. PATENT DOCUMENTS

| 4,769,845 A * | 9/1988 | Nakamura ......... G06K 9/00268 382/100 |
| 8,700,392 B1 * | 4/2014 | Hart ....................... G10L 15/25 704/231 |
| 2007/0100690 A1 | 5/2007 | Hopkins |
| 2011/0071830 A1 * | 3/2011 | Kim ..................... G01C 21/3602 704/246 |
| 2011/0302160 A1 * | 12/2011 | Juan ....................... G06Q 10/10 707/723 |
| 2013/0331147 A1 * | 12/2013 | Chang ..................... H04W 4/18 455/556.1 |
| 2014/0297418 A1 | 10/2014 | Gaur |
| 2015/0195620 A1 * | 7/2015 | Buchner ............ H04N 21/4788 725/141 |
| 2016/0140614 A1 | 5/2016 | Brubaker |
| 2017/0257606 A1 * | 9/2017 | Walke ..................... G09F 19/18 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Marilyn G Macasiano
(74) *Attorney, Agent, or Firm* — Anthony Curro, Esq.; McGinn IP Law Group, PLLC (57) ABSTRACT A fixed-wing aircraft advertisement method, system, and non-transitory computer readable medium for a fixed-wing aircraft, include a user observing circuit configured to observe a plurality of users to identify a speaking user, a word identifying circuit configured to identify a keyword profile from words of the speech of the speaking user, and an advertisement selecting and delivering circuit configured to select an advertisement to deliver via the fixed-wing aircraft based on the advertisement being associated with the keyword profile.

19 Claims, 6 Drawing Sheets

SYSTEM, METHOD, AND RECORDING MEDIUM FOR FIXED-WING AIRCRAFT ADVERTISEMENT USING LOCALLY SAMPLED WORD LISTENING

BACKGROUND

The present invention relates generally to a fixed-wing aircraft advertisement system, and more particularly, but not by way of limitation, to a fixed-wing aircraft advertisement system for improving personalized advertisements by delivering advertisements to a geo-localized audience, based upon sampling of what a fixed-wing aircraft listens when the fixed-wing aircraft is on the verge of approaching that location, what is known about the location (e.g., profile of the location), where the advertisements are delivered from the fixed-wing aircraft (e.g., on the body of the fixed-wing aircraft, sprayed onto the sky, etc.) once they reach that location, without attempting to recognize the identities of the target audience.

Fixed-wing aircrafts are well-known and have been increasingly used to deliver products, guide athletes, surveillance, etc. Advertising has been around since the birth of commerce and digital advertising has been around since the birth of digital commerce, including location-profile based mass advertising. Also, detecting words from speech has been a hot area of research with significant success.

Conventional advertisement optimization techniques rely on knowing a user identity to mine user data and distribute an optimized advertisement. These techniques lead to security concerns as some users may not wish to share their identity.

However, there is a void in the technical field for any techniques that carry out advertising from samples of speech heard by fixed-wing aircrafts (or optimizing on what of so much speech to listen to), at given locations. Also, there is a technical problem that the advertisement optimizing techniques rely on extracting an identity of the user.

SUMMARY

In view of the newly discovered problem in the art (e.g., no systems or methods exist), the inventors have considered a non-abstract improvement to a computer technology in which a system can observe users of a group engaged in conversation, determine keywords from the conversation using microphones of a fixed-wing aircraft, and optimally distribute advertisements via the fixed-wing aircraft based on the conversation of the users without attempting to recognize an identity of the user.

In an exemplary embodiment, the present invention can provide a fixed-wing aircraft advertisement system for a fixed-wing aircraft, the system including a user observing circuit configured to observe a plurality of users to identify a speaking user, a word identifying circuit configured to identify a keyword profile from words of the speech of the speaking user, and an advertisement selecting and delivering circuit configured to select an advertisement to deliver via the fixed-wing aircraft based on the advertisement being associated with the keyword profile.

Further, in another exemplary embodiment, the present invention can provide a fixed-wing aircraft advertisement method for a fixed-wing aircraft, the method including observing a plurality of users to identify a speaking user, identifying a keyword profile from words of the speech of the speaking user, and selecting an advertisement to deliver via the fixed-wing aircraft based on the advertisement being associated with the keyword profile.

Even further, in another exemplary embodiment, the present invention can provide a non-transitory computer-readable recording medium recording a fixed-wing aircraft advertisement program, the program causing a computer to perform: observing a plurality of users to identify a speaking user, identifying a keyword profile from words of the speech of the speaking user, and selecting an advertisement to deliver via the fixed-wing aircraft based on the advertisement being associated with the keyword profile.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and tell sinology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
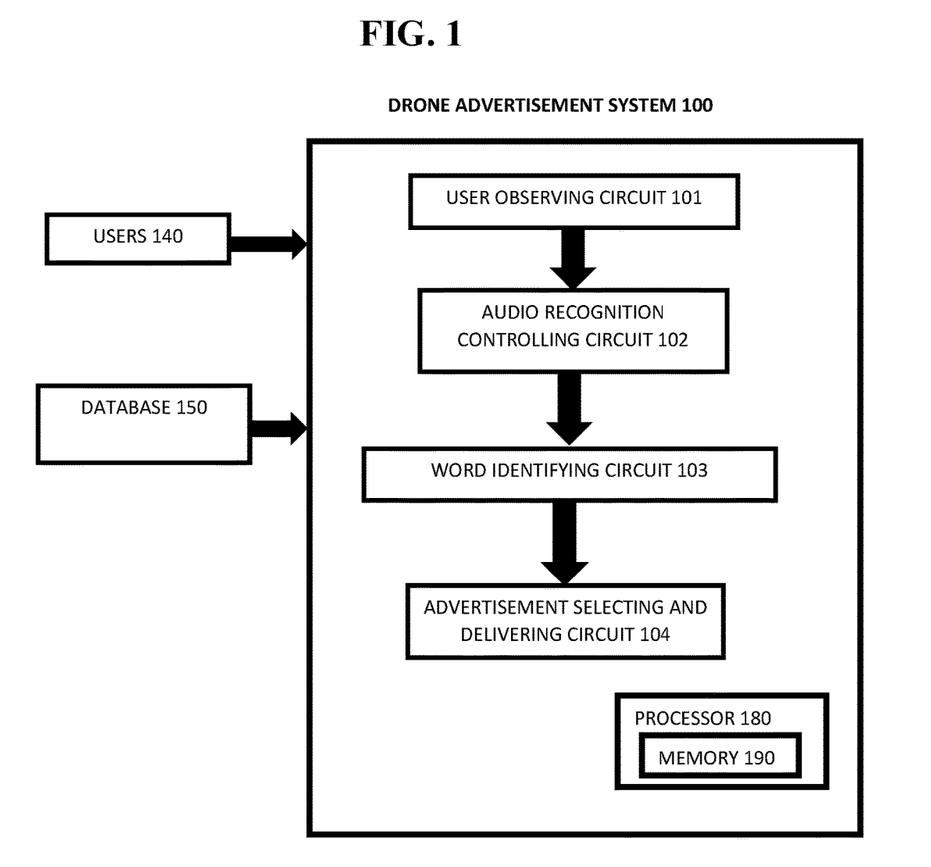
FIG. 1 exemplarily shows a block diagram illustrating a configuration of a fixed-wing aircraft advertisement system 100.

With reference now to FIG. 1, the fixed-wing aircraft advertisement system 100 includes a user observing circuit 101, an audio recognition controlling circuit 102, a word identifying circuit 103, and an advertisement selecting circuit 104. The fixed-wing aircraft advertisement system 100 includes a processor 180 and a memory 190, with the memory 190 storing instructions to cause the processor 180 to execute each circuit of fixed-wing aircraft advertisement system 100. The processor and memory may be physical hardware components, or a combination of hardware and software components.

Although the fixed-wing aircraft advertisement system 100 includes various circuits, it should be noted that the fixed-wing aircraft advertisement system can include modules in which the memory 190 stores instructions to cause the processor 180 to execute each module of fixed-wing aircraft advertisement system 100.

Also, each circuit can be a stand-alone device, unit, module, etc. that can be interconnected to cooperatively produce a transformation to a result.

With the use of these various circuits, the fixed-wing aircraft advertisement system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 4:
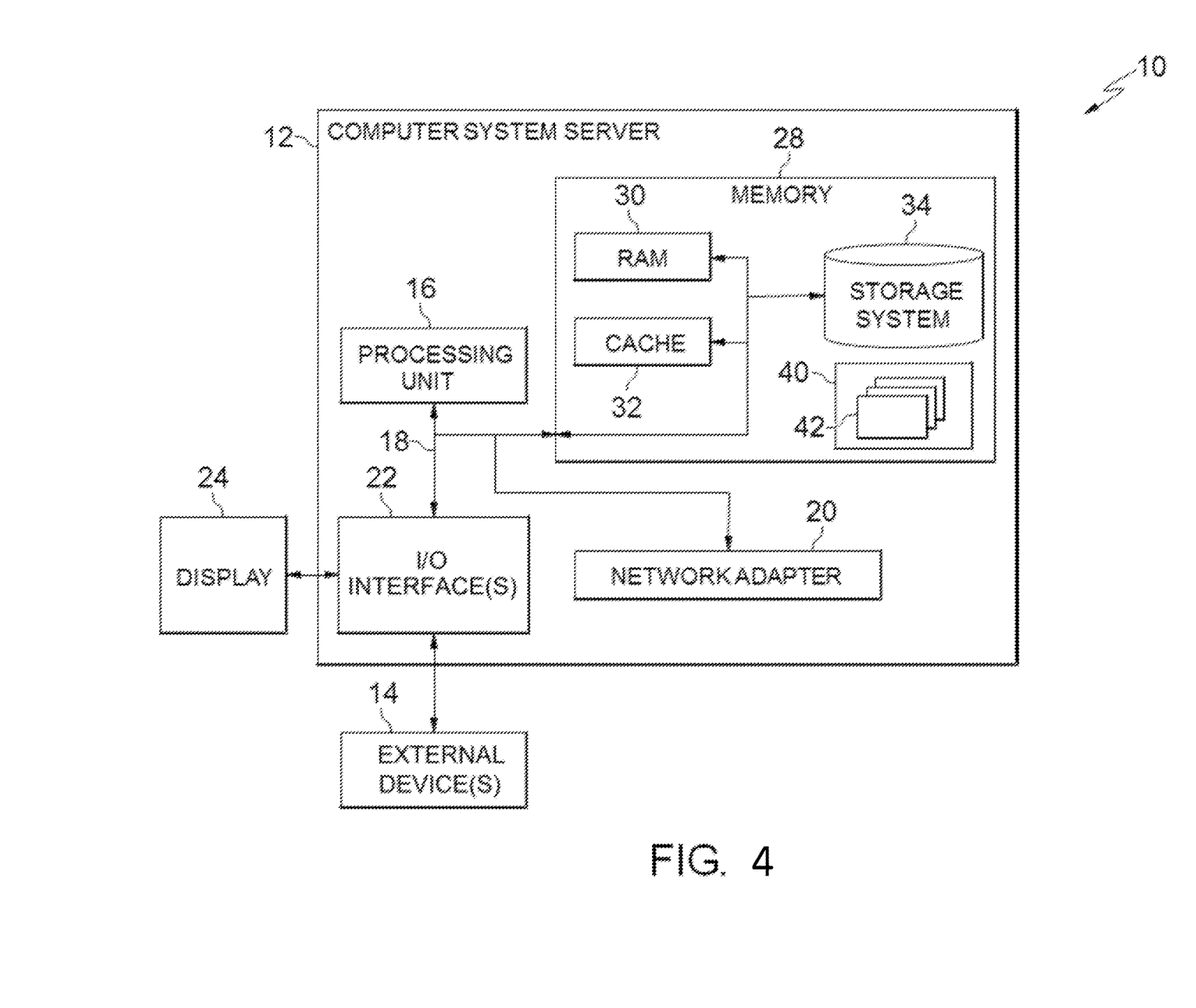
FIG. 4 depicts a cloud computing node 10 according to an exemplary embodiment of the present invention.
Figure 5:
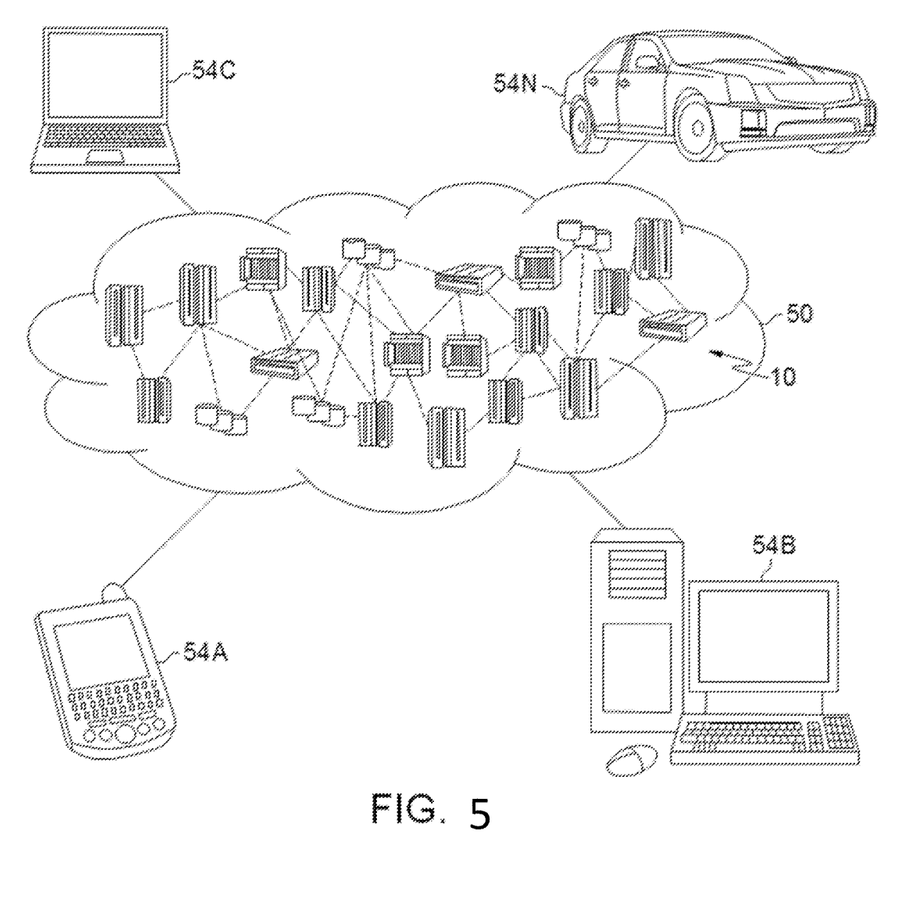
FIG. 5 depicts a cloud computing environment 50 according to another exemplary embodiment of the present invention.
Figure 6:
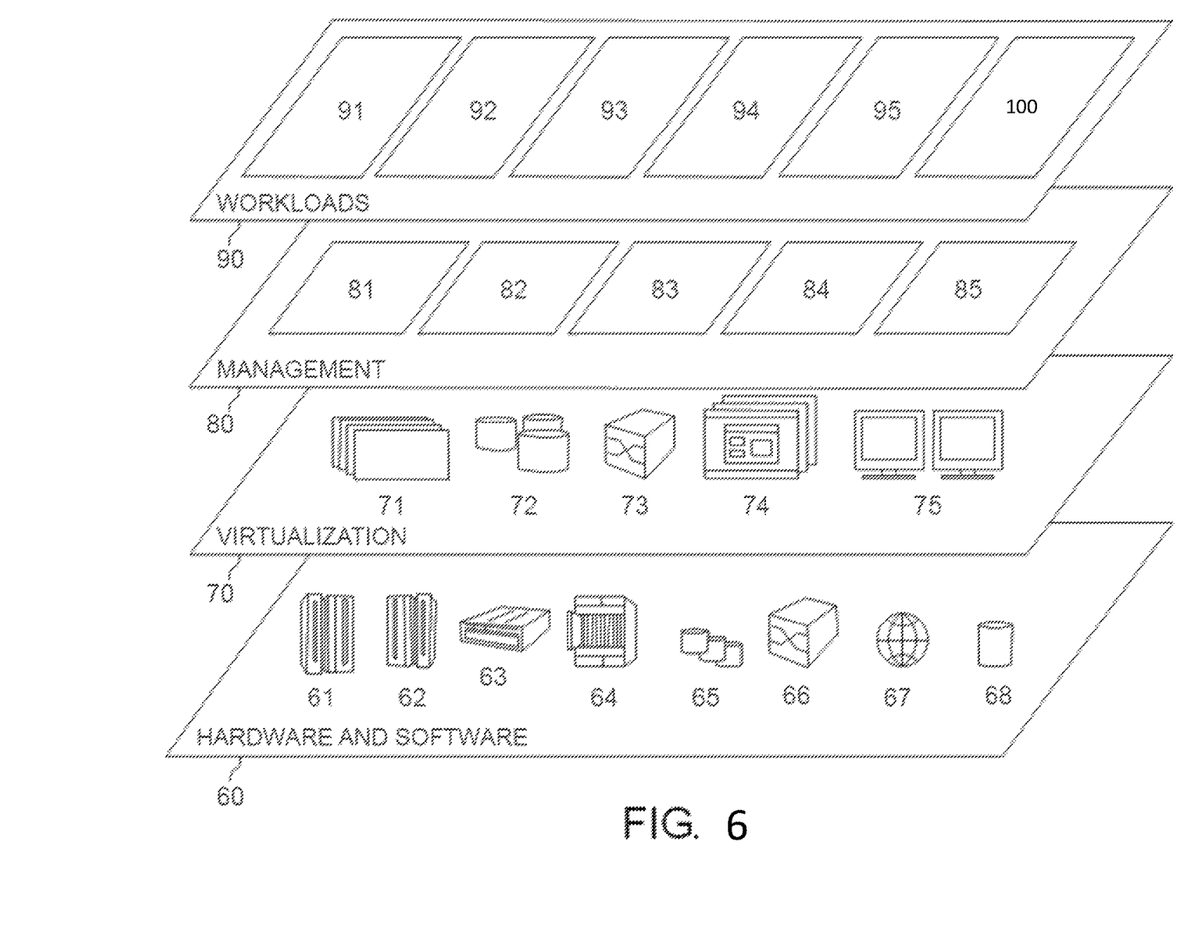
FIG. 6 depicts abstraction model layers according to an exemplary embodiment of the present invention.

Although as shown in FIGS. 4-6 and as described later, the computer system/server 12 is exemplarily shown in cloud computing node 10 as a general-purpose computing circuit which may execute in a layer the fixed-wing aircraft advertisement system 100 (FIG. 6), it is noted that the present invention can be implemented outside of the cloud environment.

The fixed-wing aircraft 300 controlled by the fixed-wing aircraft advertisement system 100 includes at least one camera and one microphone. Preferably, the fixed-wing aircraft 300 includes a plurality of cameras at different angles and directions to the fixed-wing aircraft (or reuse existing ones), that would be able to view the faces of the people in any direction that the fixed-wing aircraft is moving to (or will reach there very soon in a few moments) and a plurality of microphones, with a movable arm for fine-adjusting the precise position and angle of the microphones, that would be able to capture the samples of speech from sufficient distance (typically 50-300 yards) and over multiple users. Many modifications and variations of the cameras and microphones will be apparent to those of ordinary skill in the art without departing from the scope and spirit of the described embodiments.

Also, the fixed-wing aircraft 300 comprises a network connectivity capability so that the fixed-wing aircraft 300 can communicate with a backend ad server (e.g., a database 150 or a system control). In one embodiment, the fixed-wing aircraft 300 can be enabled with a local ad database, with the expectation that the customers of the invention (e.g., advertisers) cannot update ads (delivery, activity status such as active/paused, etc.) in near-real time with any guarantee. Further, some (e.g., a small fraction of the total) processing power of the fixed-wing aircraft 300 is for computing facial landmarks (e.g., as embodied by the user observing circuit 101 as described later), and install the software modules that are needed, such as facial landmark computation, speech recognition and word sampling, NLP algorithms such as word-vector based keyword retrieval. Many modifications and variations of the fixed-wing aircraft and capabilities of the fixed-wing aircraft will be apparent to those of ordinary skill in the art without departing from the scope and spirit of the described embodiments.

The fixed-wing aircraft further includes, for example, light-emitting diodes (e.g., a display projection capability) to the fixed-wing aircraft 300 for showing text advertisement when there is low light levels (e.g., night time) and includes a video (image) screen so that video (still image) advertisements can be shown. The fixed-wing aircraft 300 can also include chemical spray capability for writing ads onto the blue sky in the daytime. Many modifications and variations of the fixed-wing aircraft and capabilities of the fixed-wing aircraft to display advertisements will be apparent to those of ordinary skill in the art without departing from the scope and spirit of the described embodiments.

Referring now to FIG. 1, the user observing circuit 101 observes a plurality of users to identify a user that is speaking. The fixed-wing aircraft 300 points cameras in a direction facing the users, and the user observing circuit 101 detect a face of each user and detects facial landmarks (e.g., nose, eyes, lips, cheeks, etc.) of the face of each user. The user observing circuit 101 tracks the facial landmarks of each detected face, and preferably tracks the landmarks around the lips of the user face (e.g., to identify that the lips are moving indicating a speech is likely). The user observing circuit 101 identifies a top N lips with the highest movement rates, where N is the number of microphones that the fixed-wing aircraft 300 includes.

That is, the user observing circuit 101 observes a set of users talking (identifying by facial landmark displacement rate as seen by multiple cameras (e.g., an imaging device) fitted on the fixed-wing aircrafts to cover a large number of individuals) as the fixed-wing aircraft approaches (or is at) a location. In addition, the user observing circuit 101 continuously observes the set of users so that when a user stops talking and someone else starts talking, the audio recognition controlling circuit 102 can adjust accordingly.

Also, the user observing circuit 101 does not identify the identify (e.g., specifically who a user is) during the observing and only identifies facial landmarks to determine a lip movement rate to predict which users are speaking such that the audio recognition controlling circuit 102 can point the N audio detection devices to the N faces of the N user, and listen to what the N users are saying.

The audio recognition controlling circuit 102 uses speech detection algorithms (or the like) to detect the words spoken from what they speak (e.g., do random sampling in case full listening raises privacy questions). The audio recognition controlling circuit 102 controls the microphones (e.g., an audio detection device) of the fixed-wing aircraft 300 to listen to the users having the highest lip movement rate (e.g., the user speaking) based on the observation by the user observing circuit 101.

The word identifying circuit 103 identifies the words of the user identified as speaking by the user observing circuit 101 (e.g., as detecting by the microphones controlled by the audio recognition controlling circuit 102). That is, based upon a top few keywords detected from the speech of the user, the word identifying circuit 103 identifies commercially viable keywords (e.g., a keyword profile) from the words spoken by the user being observed, the frequently occurring words that tend to be spoken with these words, the semantically related words to the spoken words, etc. Also, the word identifying circuit 103 can identify the commercially viable keywords based on the location of the users (e.g., near a sporting match, a shopping mall, etc.) or based on a time of day (e.g., lunch time, dinner time, etc.).

The advertisement selecting and delivering circuit 104 selects one or more advertisements to match the keywords identified by the word identifying circuit 103 (e.g., the key word profile), the location profile, and the commercial intent profile and delivers the selected advertisement on the fixed-wing aircraft 300 when the fixed-wing aircraft 300 reaches the location it was approaching (the location that this set of ads was computed for). The advertisement selecting and delivering circuit 104 can deliver the advertisement via the fixed-wing aircraft, for example, on the sky by using a spray in the daytime, by illuminating lights in the evening, and other appropriate mechanisms for displaying the advertisement such as a text banner on a side of the fixed-wing aircraft. Or, in the case of a video advertisement, then also select appropriate video advertisements and render these ads on the screen. The fixed-wing aircraft can also include a speaker to deliver an audio advertisement.

The advertisements selected by the advertisement selecting and delivering circuit 104 are stored in the database 150 and include a pre-defined set of matching keywords (or a matching keyword profile) such that the circuit 104 can select the advertisement based on a match of the advertisement and the keyword profile.

Thus, the system 100 can select and deliver advertisements to a geo-localized audience, based upon sampling of what a fixed-wing aircraft listens when it is on the verge of approaching that location, what is known about the location (profile of the location), where the advertisements are delivered from the fixed-wing aircraft (on the body of the fixed-wing aircraft, sprayed onto the blue sky etc.) once the fixed-wing aircraft reach that location, without attempting to recognize the identities of the target audience.

Figure 3:
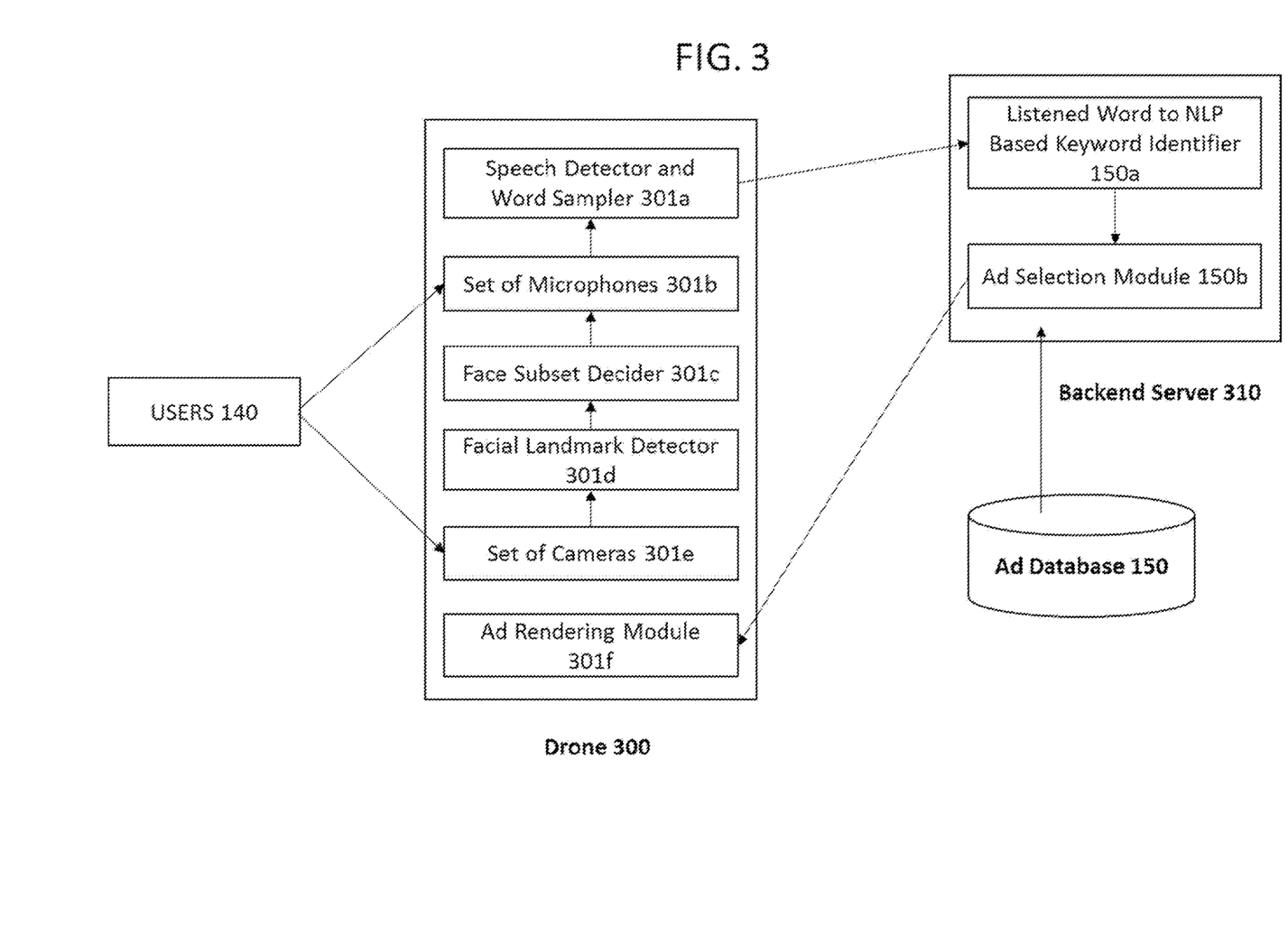
FIG. 3 exemplarily shows an exemplary flow of a fixed-wing aircraft advertisement to a group of users as facilitated by the fixed-wing aircraft advertisement system 100.

FIG. 3 shows an exemplary embodiment of the system 100 facilitating the delivering on an advertisement from the ad database 150 (i.e., the database 150).

For example, the set of cameras 301e observe the users 140 and facial landmarks are detected by the facial landmark detector 301d (e.g., as embodied by the user observing circuit 101). Based on the users having the most lip movements (e.g., the likeliest users to be speaking) as identified by the face subset decider 301c (e.g., as embodied by the user observing circuit 101), the set of microphones 301b are controlled to be pointed to the user having the most lip movements (e.g., as embodied by the audio recognition controlling circuit 102) and the speech detector and word sampler 301a (e.g., as embodied by the word identifying circuit 103) identifies commercially viable keywords (e.g., a keyword profile) from the speech of the user using a NLP based keyword identifier 150a either installed on the fixed-wing aircraft 300 or of a backend server 310. Based on the keyword profile, the ad rendering module 301f (e.g., as embodied by the advertisement selecting and delivering circuit 104) selects the advertisement to deliver to via the fixed-wing aircraft 300 from the ad database 150 via an ad selection module 150b.

Figure 2:
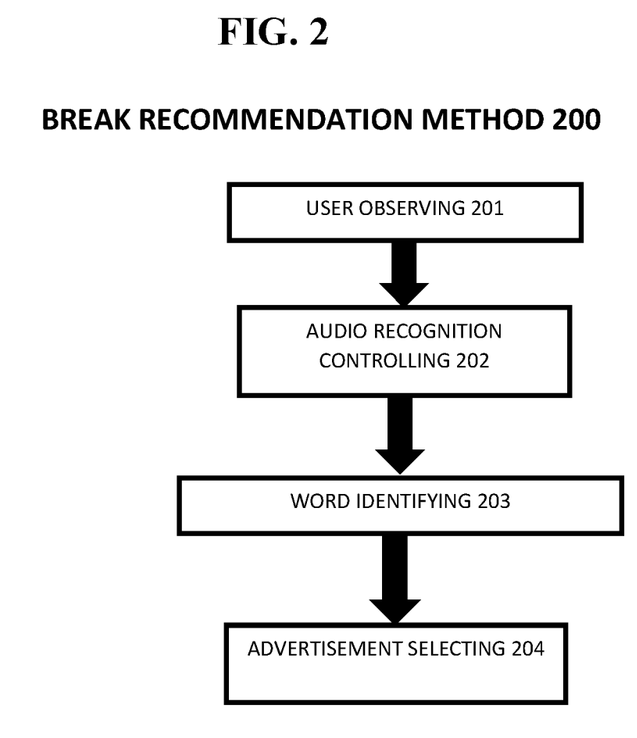
FIG. 2 exemplarily shows a high level flow chart for a fixed-wing aircraft advertisement method 200.

FIG. 2 shows a high level flow chart for a method 200 of fixed-wing aircraft advertisement.

Step 201 observes a plurality of users to identify a user that is speaking.

Step 202 controls an audio detection device to detect speech of the identified user.

Step 203 identifies a keyword profile from words of the speech of the identified user.

Step 204 selects an advertisement to be delivered via the fixed-wing aircraft based on a match of the advertisement with the keyword profile.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the fixed-wing aircraft advertisement system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A fixed-wing aircraft advertisement system for a fixed-wing aircraft, the system comprising:
   one or more processors configured to execute computer program modules, the computer program modules comprising:
   a user observing circuit configured to observe a plurality of users to identify a speaking user without observing: an identify; of the user;
   a word identifying circuit configured to identify a keyword profile from words of the speech of the speaking user; and
   an advertisement selecting and delivering circuit configured to select an advertisement to deliver via the fixed-wing aircraft based on the advertisement being associated with the keyword profile,
   wherein a second keyword profile is identified from words of speech of a second speaking user, and
   wherein the advertisement is re-selected according to a combined keyword profile that is created based on a similarity between the keyword profile and the second keyword profile.

2. The system of claim 1, wherein the user observing circuit identifies a plurality of speaking users from the plurality of users based on the plurality of speaking users having a highest lip movement rate.

3. The system of claim 1, further comprising an audio recognition controlling circuit configured to control an audio detection device on the fixed-wing aircraft to point at the speaking user to detect the words of the speaking user.

4. The system of claim 1, wherein the user observing circuit identities the speaking user by:
   detecting a face of each of the plurality of users;
   detecting facial landmarks of the plurality of users;

tracking the facial landmarks surrounding lips of each of the plurality of users to determine a movement rate of the lips of each of the plurality of users; and setting the speaking user according to which user of the plurality of users has a highest movement rate of the lips.

5. The system of claim 1, wherein the user observing circuit identifies a plurality of speaking users by:

detecting a face of each of the plurality of users;

detecting facial landmarks of the plurality of users;

tracking the facial landmarks surrounding lips of each of the plurality of users to determine a movement rate of the lips of each of the plurality of users; and setting the plurality of speaking users based on which users of the plurality of users have a highest movement rate of the lips.

6. The system of claim 5, wherein a number of the plurality of speaking users corresponds to a number of audio detection devices installed on the fixed-wing aircraft.

7. The system of claim 1, wherein the advertisement selecting and delivering circuit selects the advertisement based on each of the advertisement being associated with the keyword profile, a location of the fixed-wing aircraft, and a commercial intent profile stored in a database.

8. The system of claim 1, wherein the advertisement selecting and delivering circuit selects the advertisement based on each of the advertisement being associated with the keyword profile and a location of the fixed-wing aircraft.

9. The system of claim 1, wherein the advertisement selecting and delivering circuit selects the advertisement based on each of the advertisement being associated with the keyword profile and a commercial intent profile stored in a database.

10. The system of claim 1, wherein the word identifying circuit identifies the keyword profile before the fixed-wing aircraft arrives at a location of the plurality of users, and wherein the advertisement selecting and delivering circuit delivers the advertisement via the fixed-wing aircraft when the fixed-wing aircraft arrives at the location of the plurality of users.

11. The system of claim 1, wherein the keyword profile comprises commercially viable keywords associated with the advertisement.

12. The system of claim 1, wherein the keyword profile comprises semantically similar words to the words spoken by the speaking user.

13. The system of claim 11, wherein the word identifying circuit identifies commercial viable keywords based on a location of the fixed-wing aircraft.

14. The system of claim 1, wherein the advertisement selecting and delivering circuit delivers the advertisement via the fixed-wing aircraft by any one of:

spraying the advertisement on a sky;

illuminating lights;

a display screen disposed on the fixed-wing aircraft; and a speaker on the fixed-wing aircraft.

15. The system of claim 1, wherein the advertisement is selected devoid of an identity of the speaking user.

16. The system of claim 1, embodied in a cloud-computing environment.

17. The system of claim 1, wherein the word identifying circuit identifies the keyword profile at a time before the advertisement selecting and delivering circuit delivers the advertisement via the fixed-wing aircraft.

18. A fixed-wing aircraft advertisement method for a fixed-wing aircraft, the method comprising:

observing a plurality of users to identify a speaking user without observing an identity of the user;

identifying a keyword profile from words of the speech of the speaking user; and selecting an advertisement to deliver via the fixed-wing aircraft based on the advertisement being associated with the keyword profile, wherein a second keyword profile is identified from words of speech of a second speaking user, and wherein the advertisement is re-selected according to a combined keyword profile that is created based on a similarity between the keyword profile and the second keyword profile.

19. A non-transitory computer-readable recording medium recording a fixed-wing aircraft advertisement program, the program causing a computer to perform:

observing a plurality of users to identify a speaking user without observing an identity of the user;

identifying a keyword profile from words of the speech of the speaking user; and selecting an advertisement to deliver via the fixed-wing aircraft based on the advertisement being associated with the keyword profile, wherein a second keyword profile is identified from words of speech of a second speaking user, and wherein the advertisement is re-selected according to a combined keyword profile that is created based on a similarity between the keyword profile and the second keyword profile.

* * * * *